United States Patent Office 3,014,912
Patented Dec. 26, 1961

3,014,912
PIPERIDINE DERIVATIVES AND METHOD
FOR PREPARING SAME
Vladimir Petrow and Oliver Stephenson, London, England, assignors to The British Drug Houses Limited, London, England, a British company
No Drawing. Filed Mar. 3, 1958, Ser. No. 718,497
Claims priority, application Great Britain Mar. 12, 1957
9 Claims. (Cl. 260—294.3)

The invention is for improvements in or relating to the preparation of organic compounds.

It is an object of the present invention to provide new compounds which are of value on account of their analgesic properties.

It is another object of the present invention to provide pharmaceutical preparations of the new compounds.

It is well known that piperidine derivatives having the general formula

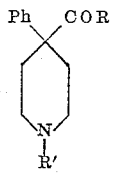
(I)

where R is a lower alkoxy or lower alkyl radical containing from 1 to 3 carbon atoms, and R' is a methyl radical have pronounced analgesic properties. It is further known that the biological properties of such compounds depend greatly upon the nature of the group R', and that any change in the group R' from lower alkyl and in particular methyl leads, in general, to a marked diminution in analgesic activity.

We have made the unexpected discovery that replacement of the methyl group (R') in compounds having the general Formula I above by the 3-aryloxy-2-hydroxypropyl residue (II).

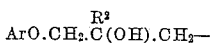

(II; where $R^2$ is hydrogen or a methyl group) leads to compounds with analgesic activity which may even exceed that of the corresponding compounds in which R' is a methyl group.

According to the present invention therefore there are provided new compounds of the general formula

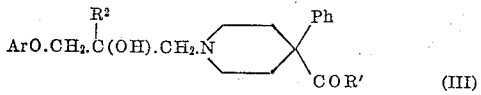
(III)

where Ar represents an aryl or substituted aryl group (such as o-, m- or p-tolyl, o-, m- or p-methoxyphenyl or lower alkoxyphenyl having from 1 to 6 carbon atoms in the alkoxy group, o-, m- or p-chlorophenyl, o-, m- or p-bromophenyl, o-, m- or p-fluorophenyl or o-, m- or p-aminophenyl or acyl derivatives thereof), $R^2$ represents hydrogen or a methyl group and R' represents a lower alkoxy (e.g. ethoxy) or lower alkyl (e.g. ethyl) group containing from 1 to 3 carbon atoms.

The invention also provides the specific new compounds 1-(4'-ethoxycarbonyl-4'-phenyl)-piperidino-3-o-toloxy-propan-2-ol and its hydrochloride,
1-(4'-ethoxycarbonyl-4'-phenyl)-piperidino-3-p-acetamidophenoxypropan-2-ol,
1-(4'-ethoxycarbonyl-4'-phenyl)-piperidino-3-p-amino phenoxypropan-2-ol hydrochloride,
1-(4'-ethoxycarbonyl-4'-phenyl)-piperidino-3-phenoxy-propan-2-ol and salts thereof,
1-(4'-ethoxycarbonyl-4'-phenyl)-piperidino-3-o-chlorophenoxypropan-2-ol and its hydrochloride,
1-(4'-ethoxycarbonyl-4'-phenyl)-piperidino-3-m-toloxy-propan-2-ol and its hydrochloride,
1-(4'-ethoxycarbonyl-4'-phenyl)-piperidino-3-p-toloxy-propan-2-ol and its hydrochloride,
1-(4'-ethoxycarbonyl-4'-phenyl)-piperidino-3-p-ethoxy-carbonylphenoxy-propan-2-ol and its hydrochloride,
1-(4'-ethoxycarboyl-4'-phenyl)-piperidino-3-o-fluorophenoxy-propan-2-ol and its hydrochloride,
1-(4'-ethoxycarbonyl-4'-phenyl)-piperidino-2-methyl-3-o-toloxy-propan-2-ol hydrochloride,
1-(4'-ethoxycarbonyl-4'-phenyl)-piperidino-3-o-allyl-phenoxy-propan-2-ol hydrochloride,
1-(4'-ethoxycarbonyl-4'-phenyl)-piperidino-3-m-chlorophenoxypropan-2-ol and its hydrochloride,
1-(4'-ethoxycarbonyl-4'-phenyl)-piperidino-3-p-chlorophenoxypropan-2-ol and its hydrochloride,
1-(4'-ethoxycarbonyl-4'-phenyl)-piperidino-3-o-methoxy-phenoxypropan-2-ol and its hydrochloride, and
1-(4'-ethoxycarbonyl-4'-phenyl)-piperidino-2-methyl-3-phenoxypropan-2-ol hydrochloride.

According to the present invention there is also provided a method for the preparation of new piperidine derivatives having the general Formula III above which method comprises reacting the appropriate 3-aryloxy-1:2-epoxypropane having the general formula

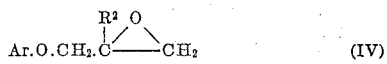
(IV)

where Ar and $R^2$ have the same meaning as above with a piperidine derivative having the formula

(V)

where R' has the same meaning as above. Alternatively the new piperidine derivatives having the general Formula III above may be prepared by reacting the appropriate 3-aryloxy-2-hydroxypropyl chloride having the general formula

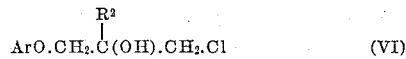
(VI)

where Ar and $R^2$ have the same meaning as above with a piperidine derivative having the Formula V above in the presence of a hydrogen chloride abstractor. The hydrogen chloride abstractor may be sodium carbonate or sodium hydroxide.

In the preparation of compounds in which Ar represents o-, m- or p-aminophenyl it is desirable to protect the aminophenyl group in the intermediates of general Formula IV or VI and subsequently regenerate the aminophenyl group by methods known to those skilled in the art.

Condensation of the epoxides (IV) or chlorohydrins (VI) with the piperidine bases (V) may be accomplished in the absence of solvents or in the presence of solvents such as, for example, ethanol, benzene or light petroleum.

The products obtained may be isolated directly in a crystalline state or may be isolated by standard techniques involving fractional distillation under reduced pressure. Alternatively, the products may be isolated as their salts with inorganic or organic acids, such as hydrochloric acid, isethionic acid, lactic acid.

Pharmaceutical preparations of the products of the invention may take the form of tablets or capsules for oral administration containing the free base or of a salt thereof. Similarly, elixirs and syrups, appropriately flavoured and preserved, may also be formulated from the free base or salts thereof, such as for example, the water soluble hydrochlorides. Solutions suitable for injection may likewise be formulated and can be prepared, for example, from any convenient water soluble salt such as the hydrochloride.

Following is a description by way of example of methods of carrying the invention into effect.

EXAMPLE 1

*1-(4'-ethoxycarbonyl-4'-phenyl)-piperidino-3-o-toloxypropan-2-ol*

(III: Ar=o-tolyl, $R^2$=H, R'=OEt)

3-o-toloxy-1:2-epoxypropane (5.7 g.) was added to a solution of 4-ethoxycarbonyl-4-phenylpiperidine (8.0 g.) in light petroleum (10 ml., B.P. 60° to 80° C.) and the mixture heated under reflux on the steam-bath for 3 hours.

After cooling the solution was treated with a slight excess of a solution of hydrochloric acid gas in ethanol. Dilution of the warm solution with ether yielded the product as its crystalline hydrochloride.

It was purified by crystallisation from ethanol, separating from this solvent in white prismatic crystals, M.P. 188° to 189° C. The hydrochloride was also purified by crystallisation from water.

EXAMPLE 2

*1-(4'-ethoxycarbonyl-4'-phenyl)-piperidino-3-p-acetamido-phenoxypropan-2-ol*

(III; Ar=p-NHAc.$C_6H_4$—, $R^2$=H, R'=OEt)

4-ethoxycarbonyl-4-phenylpiperdine (20.6 g.) was added to a solution of 1-p-acetamidophenoxy-2:3-epoxypropane (18.3 g.) in ethanol (50 ml.). A slightly exothermic reaction ensued and when this had subsided the mixture was heated on the steam-bath for 1 hour.

After removal of the ethanol the residue solidified. A portion of the product was purified by crystallisation from ethyl acetate when it had M.P. 144° to 145° C.

*1-(4'-ethoxycarbonyl-4'-phenyl)-piperidino-3-p-amino phenoxypropan-2-ol hydrochloride*

(III; Ar=p.$NH_2$.$C_6H_4$—, $R^2$=H, R'=OEt)

The foregoing acetamido-derivative (20 g.) was dissolved in ethanol (50 ml.), treated with a solution of hydrochloric acid gas (8 g.) in ethanol (50 ml.) and the mixture heated under reflux for 6 hours. After removal of the ethanolic hydrochloric acid at reduced pressure the residual solid was purified by crystallisation from a mixture of ethanol and ethyl acetate to yield the product in small white crystals M.P. ca. 230° C. (with decomp.).

EXAMPLE 3

*1-(4'-ethoxycarbonyl-4-phenyl)-piperidino-3-phenoxypropan-2-ol*

A mixture of 4-ethoxycarbonyl-4-phenyl piperidine (8.2 g.) and 3-phenoxy-1:2-epoxypropane (5.3 g.) in light petroleum (20 ml., B.P. 60° to 80° C.) was heated on the steam-bath for 1 hour. The product crystallised on cooling and was purified by crystallisation from aqueous ethanol, forming small shining needles of M.P. 111° C.

The foregoing base was converted to the hydrochloride in concentrated ethanolic solution. The latter compound crystallised from a mixture of ethanol and ether in shining white prisms of M.P. 178° to 179° C.

*Other salts of 1-(4'-ethoxycarbonyl-4'-phenyl)-piperidino-3-phenoxypropan-2-ol*

The hydrobromide separated from ethanol in white needles of M.P. 163° to 164° C.

The acid sulphate separated from ethanol in granular crystals of M.P. 181° to 183° C. These resolidified and then remelted at 263° to 264° C. (with decomposition). When the melting point was taken very slowly the lower melting point was not noted.

The dihydrogen phosphate crystallised from aqueous ethanol in white needles of M.P. 174° to 175° C.

The hypophosphite separated from mixtures of ethanol and ether in white needles of M.P. 114.7° to 116.5° C. (corr.).

The sulphamate separated from ethanol in sparingly soluble crystals of M.P. 166° C.

The glycerophosphate had M.P. 153° to 154° C. after crystallisation from a mixture of ethanol and ether.

The methane sulphonate crystallised from ethanol in needles of M.P. 150° to 151° C. The isethionate was obtained in shining plates of M.P. 131° to 133° C. after crystallisation from a mixture of ethanol and ether.

The lactate had M.P. 132° to 133° C. after crystallisation from a mixture of ethanol and ether.

The tartrate separated from water containing a small amount of ethanol in small white needles of M.P. 137° to 138° C.

EXAMPLE 4

*1-(4'-ethoxycarbonyl-4'-phenyl)-piperidino-3-o-chlorophenoxy-propan-2-ol*

3-o-chlorophenoxy-1:2-epoxypropane (7.1 g.) was added to a solution of 4-ethoxycarbonyl-4-phenylpiperidine in light petroleum (10 ml., B.P. 60° to 80° C.). The mixture was heated on the steam-bath for 2 hours and the product separated on cooling. The base was purified by crystallisation from aqueous ethanol and had M.P. 81° to 83° C. The hydrochloride had M.P. 171° to 172° C. after crystallisation from a mixture of ethanol and ether.

EXAMPLE 5

*1-(4'-ethoxycarbonyl-4'-phenyl)-piperidino-3-m-toloxy-propan-2-ol*

A mixture of 3-m-toloxy-1:2-epoxypropane (8.2 g.) and 4-ethoxycarbonyl-4-phenyl piperidine (11.7 g.) in light petroleum (15 ml., B.P. 60° to 80° C.) was heated on the steam-bath for 3 hours. The base which separated on cooling was purified by crystallisation from aqueous ethanol or from light petroleum (B.P. 60° to 80° C.), forming white fluffy needles of M.P. 80° to 81° C.

The hydrochloride crystallised from a mixture of ethanol and ether in minute shining needles of M.P. 157° to 159° C.

EXAMPLE 6

*1-(4'-ethoxycarbonyl-4'-phenyl)-piperidino-3-p-toloxy-propan-2-ol*

To a solution of 4-ethoxycarbonyl-4-phenyl piperidine (12.5 g.) in absolute ethanol (25 ml.) was added 2-hydroxy-3-p-toloxypropyl chloride (10.75 g.) followed by anhydrous sodium carbonate (2.85 g.). The mixture was heated on the steam-bath under reflux for 5 hours. It was cooled, diluted well with water and the gummy oil extracted with chloroform. The chloroform extract was washed with water and the chloroform distilled off. The residual oil solidified rapidly. It was purified by crystallisation from a mixture of ethanol and light petroleum (B.P. 60° to 80° C.) or from aqueous ethanol, yielding the base as white fluffy needles of M.P. 111° to 113° C. The hydrochloride crystallised from a mixture of ethanol and ether in small white needles of M.P. 152° to 154° C.

EXAMPLE 7

*1-(4'-ethoxycarbonyl-4'-phenyl)-piperidino-3-p-ethoxycarbonyl-phenoxy-propan-2-ol*

3-p-ethoxycarbonylphenoxy-1:2-epoxypropane (9.6 g.) was added to a solution of 4-ethoxycarbonyl-4-phenyl-piperidine in light petroleum (20 ml., B.P. 60° to 80° C.) and the mixture heated on the steam-bath for 3 hours. The base solidified on cooling. It crystallised from a mixture of ethanol and light petroleum (B.P. 60° to 80° C.) in white fluffy needles, M.P. 86° to 88° C.

The hydrochloride separated from a mixture of ethanol and ether in small white needles of M.P. 174° to 176° C.

EXAMPLE 8

*1-(4'-ethoxycarbonyl-4'-phenyl)-piperidino-3-o-fluoro-phenoxy-propan-2-ol*

This compound was prepared by reaction of 3-o-fluoro-phenoxy-1:2-epoxypropane (7.9 g.) with 4-ethoxycarbonyl-4-phenylpiperidine (11 g.) in light petroleum (20 ml., B.P. 60° to 80° C.).

It was crystallised from ethanol in white needles, M.P. 80° to 81° C.

The hydrochloride separated from a mixture of ethanol and ether and had M.P. 159° C.

EXAMPLE 9

*1-(4'-ethoxycarbonyl-4'-phenyl)-piperidino-3-o-allyl-phenoxypropan-2-ol-hydrochloride*

To a solution of 4-ethoxycarbonyl-4-phenyl piperidine (12.7 g.) in light petroleum (15 ml., B.P. 60° to 80° C.) was added 3-o-allylphenoxy-1:2-epoxypropane (10.35 g.) and the mixture heated on the steam-bath for 2 hours.

After cooling the mixture was treated with a slight excess of ethanolic hydrochloric acid. The hydrochloride separated immediately and was purified by crystallisation from 20% ethanol, forming small, white shining plates of M.P. 198° to 200° C.

EXAMPLE 10

*1-(4'-ethoxycarbonyl-4'-phenyl)-piperidino-2-methyl-3-o-toloxy-propan-2-ol hydrochloride*

A mixture of 3-o-toloxy-2-methyl-1:2-epoxypropane (6.8 g.) and 4-ethoxy carbonyl-4-phenyl piperidine (8.9 g.) in light petroleum (20 ml., B.P. 60° to 80° C.) was heated on the steam-bath for 2 hours. After removal of solvent the viscous residue was converted directly to the hydrochloride in ethanolic solution. It was purified by crystallisation from a mixture of ethanol and ether and had M.P. 177° C.

EXAMPLE 11

*1-(4'-ethoxycarbonyl-4'-phenyl)-piperidino-3-m-chlorophenoxypropan-2-ol*

This compound was prepared by the condensation of 3-m-chlorophenoxy-1:2-epoxypropane (9.25 g.) with 4-ethoxycarbonyl-4-phenyl piperidine (11.7 g.) in light petroleum (40 ml., B.P. 60° to 80° C.). It was crystallised from aqueous ethanol in white needles, M.P. 89° to 90° C.

The hydrochloride separated from a mixture of ethanol and ether and had M.P. 162° to 163° C.

EXAMPLE 12

*1-(4'-ethoxycarbonyl-4'-phenyl)-piperidino-3-p-chloro-phenoxypropan-2-ol*

A mixture of 3-p-chlorophenoxy-1:2-epoxypropane (8.0 g.) and 4-ethoxycarbonyl-4-phenylpiperidine (10.0 g.) in light petroleum (25 ml., B.P. 60° to 80° C.) was warmed on the steam-bath for 2 hours. The product separated on slight cooling. It was purified by crystallisation from aqueous ethanol yielding white needles of M.P. 103° to 104° C.

The hydrochloride separated from a mixture of ethanol and ether in white needles of M.P. 165° to 166° C.

EXAMPLE 13

*1-(4'-ethoxycarbonyl-4'-phenyl)-piperidino-3-o-methoxyphenoxypropan-2-ol*

3-o-methoxyphenoxy-1:2-epoxypropane (9.0 g.) was added to a solution of 4-ethoxycarbonyl-4-phenyl piperidine (11.7 g.) in light petroleum (25 ml., B.P. 60° to 80° C.) containing a few drops of ethanol, and the mixture heated under reflux for 2 hours. The product which separated on cooling was purified by crystallisation from aqueous ethanol forming white needles, M.P. 89° to 90° C.

The hydrochloride separated from a mixture of ethanol and ether in white needles M.P. 147° to 148° C.

EXAMPLE 14

*1-(4'-ethoxycarbonyl-4'-phenyl)-piperidino-2-methyl-3-phenoxypropan-2-ol hydrochloride*

A mixture of 3-phenoxy-2-methyl-1:2-epoxypropane (8.2 g.) and 4-ethoxycarbonyl-4-phenyl piperidine (11.65 g.) in light petroleum (25 ml., B.P. 60° to 80° C.) was heated on the steam-bath for 2 hours. After removal of solvent the oily base was converted directly to the hydrochloride in ethanolic solution. The latter crystallised from a mixture of ethanol and ether in white needles of M.P. 171° to 172° C.

We claim:

1. A piperidine derivative selected from the group consisting of a compound having the formula

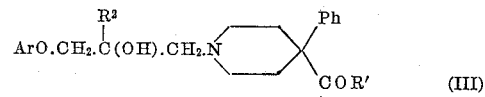

where Ar is a monocarbocyclic aryl radical having six ring-carbon atoms, $R^2$ represents a radical selected from the group consisting of hydrogen and methyl and R' represents a lower alkoxy group containing from 1 to 3 carbon atoms; and an acid addition salt of said compound.

2. 1 - (4' - ethoxycarbonyl - 4' - phenyl) - piperidino-3-o-toloxypropan-2-ol.

3. 1 - (4' - ethoxycarbonyl - 4' - phenyl) - piperidino-3-p-amino phenoxypropan-2-ol hydrochloride.

4. 1 - (4' - ethoxycarbonyl - 4' - phenyl) - piperidino-3-phenoxypropan-2-ol.

5. 1 - (4' - ethoxycarbonyl - 4' - phenyl) - piperidino-3-o-chlorophenoxypropan-2-ol.

6. 1 - (4' - ethoxycarbonyl - 4' - phenyl) - piperidino-3-m-toloxy-propan-2-ol.

7. 1 - (4' - ethoxycarbonyl-4' - phenyl) - piperidino-3-o-fluorophenoxy-propan-2-ol.

8. 1 - (4' - ethoxycarbonyl - 4' - phenyl) - piperidino-3-o-methoxyphenoxypropan-2-ol.

9. A method for the preparation of piperidine derivatives having the general formula

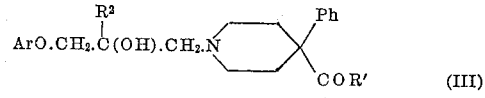

where Ar is a monocarbocyclic aryl radical having six ring-carbon atoms, $R^2$ represents a radical selected from the group consisting of hydrogen and methyl and R' represents a lower alkoxy group containing from 1 to 3 carbon atoms which method comprises reacting the appropriate 3-aryloxy-1:2-epoxypropane having the general formula

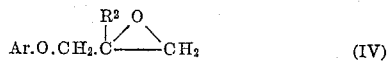

where Ar and R² have the same meaning as above with a piperidine derivative having the formula
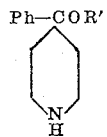
(V)
where R' has the same meaning as above.
References Cited in the file of this patent
UNITED STATES PATENTS
| | | |
|---|---|---|
| 2,004,132 | Rider et al. | June 11, 1935 |
| 2,033,740 | Rider et al. | Mar. 10, 1936 |
| 2,846,437 | Elpern | Aug. 5, 1958 |
| 2,850,497 | Ehrhart et al. | Sept. 2, 1958 |
OTHER REFERENCES
Perrini et al.: J. Org. Chem., vol. 21, pages 125–26 (1956).